United States Patent [19]

Sokoloff

[11] 3,821,708

[45] June 28, 1974

[54] ELECTRONIC CONTROL UNIT FOR THE LINKING OF SYMMETRICAL CLOSED CHAINS OF WORDS IN A RANDOM-ACCESS MEMORY

[76] Inventor: Boris Alexandre Sokoloff, 4 rue Boris Vilde, 92 Fontenay aux Roses, France

[22] Filed: Aug. 17, 1972

[21] Appl. No.: 281,275

Related U.S. Application Data

[63] Continuation of Ser. No. 39,038, May 20, 1970, abandoned.

[30] Foreign Application Priority Data

May 20, 1969 France .............................. 69.16325

[52] U.S. Cl. .............................................. 340/172.5
[51] Int. Cl. ........................... G06f 7/38, G06f 13/06
[58] Field of Search .................................. 340/172.5

[56] References Cited

UNITED STATES PATENTS

| | | | |
|---|---|---|---|
| 3,412,382 | 11/1968 | Couleur et al. | 340/172.5 |
| 3,521,240 | 7/1970 | Bahrs et al. | 340/172.5 |
| 3,614,746 | 10/1971 | Klinkhamer | 340/172.5 |
| 3,647,348 | 3/1972 | Smith et al. | 340/172.5 X |
| 3,647,979 | 3/1972 | Rubin | 340/172.5 X |
| 3,686,641 | 8/1972 | Logan et al. | 340/172.5 |

OTHER PUBLICATIONS

Knuth, Donald E., Fundamental Algorithms – The Art of Computer Programming, Vol. 1; 1968.

*Primary Examiner*—Raulfe B. Zache
*Assistant Examiner*—Melvin B. Chapnick
*Attorney, Agent, or Firm*—Cushman, Darby & Cushman

[57] ABSTRACT

An electronic logical sequential and timing unit used as an information retrieval device connected to a conventional binary coded non-permanent storage unit. The phases of the sequential unit and the externally modifiable contents of two specialized registers act together, upon external commands to the sequential unit, to modify in a prescribed manner, the contents of specialized segments or pointers of the two words whose addresses are specified by the two specialized registers and the pointers of two other words directly linked to the first two words. The principal commands merge two closed symmetrical chains in one of the addresses specified by the two specialized registers corresponding to two words or members of two different chains and alternatively split one closed symmetrical chain into two separate chains if the two words are members of the same chain. An initialization command merges all of the words of the memory in a unique closed symmetrical chain used further as garbage collector or reserve chain. Other commands and means are used for the testing of the eventual vacuity of a chain whose address at one of the members is specified by the content of the address register of the random access memory. Other commands and means are used for the writing or the reading of the contents of another segment of the words, usually binary coded form of symbols of information, especially the writing or reading of the contents of all of the members of a chain in the backward or in the forward direction. The invention is applicable to electronic automatic computers especially for the processing in real time of data structured in files.

4 Claims, 12 Drawing Figures

INVENTOR
BORIS A. SOKOLOFF
BY
ATTORNEYS

PATENTED JUN 28 1974

3,821,708

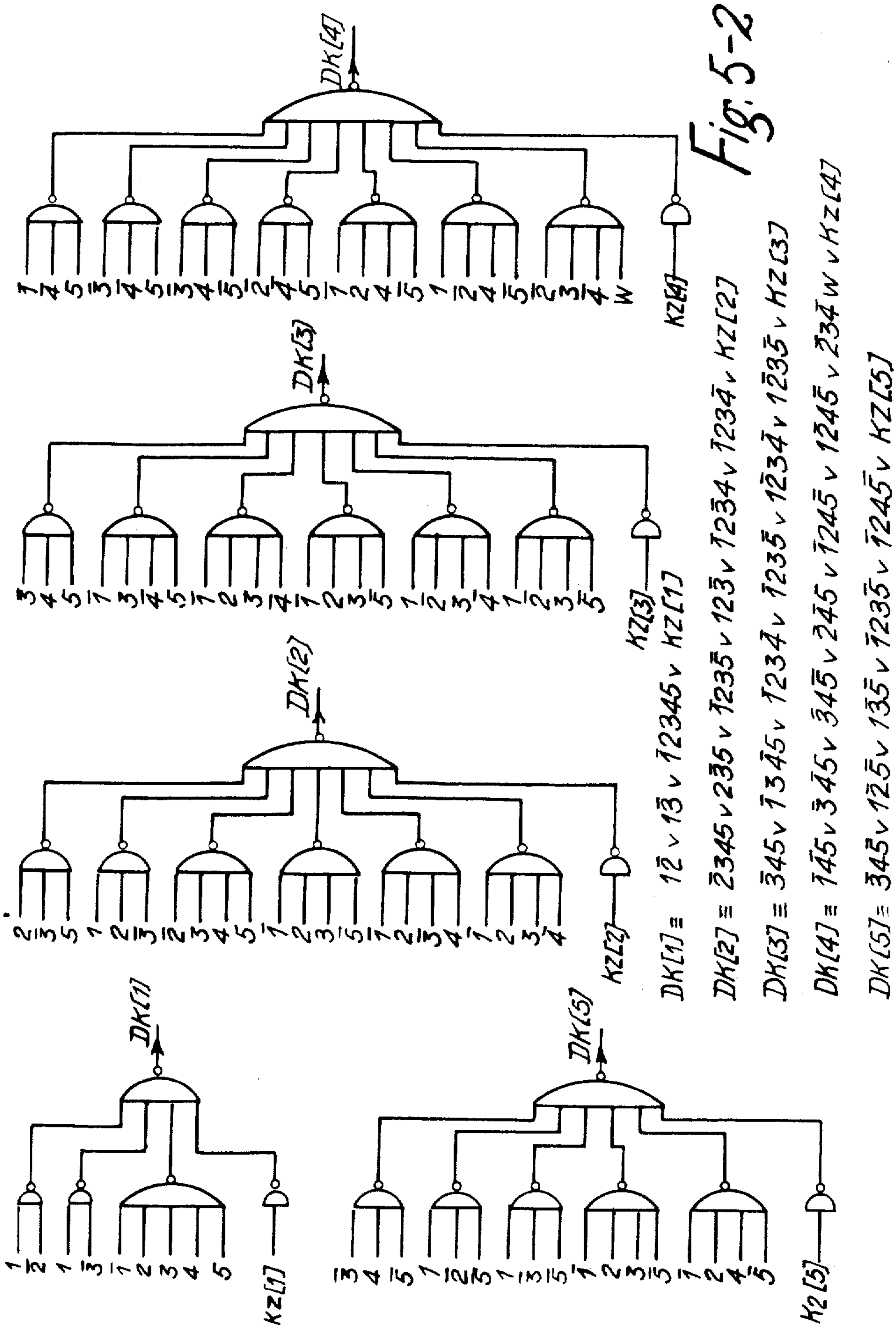

Fig. 5-2

$DK[1] \equiv 1\bar{2} \vee 1\bar{3} \vee \bar{1}2345 \vee KZ[1]$ $DK[2] \equiv \bar{2}345 \vee 2\bar{3}5 \vee \bar{1}23\bar{5} \vee 12\bar{3} \vee \bar{1}2\bar{3}4 \vee \bar{1}23\bar{4} \vee KZ[2]$ $DK[3] \equiv \bar{3}45 \vee \bar{1}3\bar{4}5 \vee \bar{1}23\bar{4} \vee \bar{1}23\bar{5} \vee 1\bar{2}3\bar{4} \vee 1\bar{2}3\bar{5} \vee KZ[3]$ $DK[4] \equiv \bar{1}\bar{4}5 \vee \bar{3}\bar{4}5 \vee 34\bar{5} \vee 2\bar{4}5 \vee \bar{1}24\bar{5} \vee 1\bar{2}4\bar{5} \vee \bar{2}3\bar{4}W \vee KZ[4]$ $DK[5] \equiv \bar{3}4\bar{5} \vee 1\bar{2}\bar{5} \vee 1\bar{3}\bar{5} \vee \bar{1}23\bar{5} \vee \bar{1}24\bar{5} \vee KZ[5]$

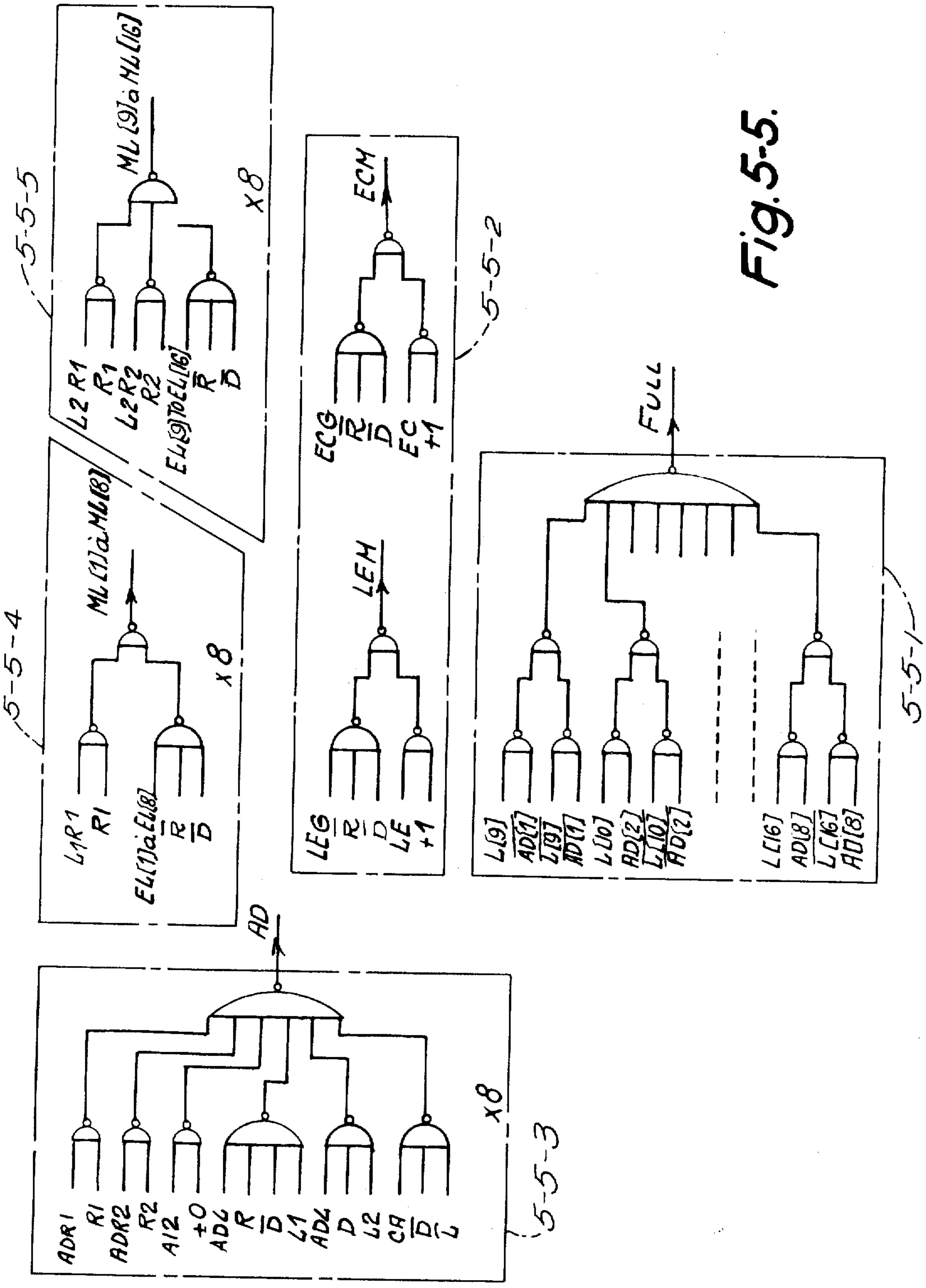
Fig. 5.5.

PATENTED JUN 28 1974 3,821,708

SHEET 11 OF 12

ELECTRONIC CONTROL UNIT FOR THE LINKING OF SYMMETRICAL CLOSED CHAINS OF WORDS IN A RANDOM-ACCESS MEMORY

CROSS-REFERENCE TO RELATED APPLICATIONS

This is a continuation of my earlier copending application Ser. No. 39,038 filed May 20, 1970, now abandoned.

BACKGROUND OF THE INVENTION

1. Field of the Invention

The present invention relates to a group of means intended to improve the effectiveness of information processing, more particularly to improve the use of erasable memories made up of an ordered series from 1 to N, of N cells individually accessible by addressing and each made up of K identical elements able to register information at two levels of physical quantities such as magnetizing or potential difference.

2. Description of the Prior Art

It is known that memories of the type described above find one of their applications in computers made to perform sequentially a series of instructions placed in cells that are consecutive or following a predetermined law of coordinates with respect to access thereto, i.e., addresses. If certain instructions known as branching instructions cause the execution sequence of the series of instructions to be resumed from a memory cell not contiguous to the preceding one in the order of execution or, in other words, not following the predetermined law, it is nonetheless true that the majority of instructions and data do occupy memory cells that are contiguous or following a predetermined law of consecutive execution thereof or access thereto. A counting device is associated directly or indirectly with the address register in most computers in use and facilitates the sequential execution of instructions and interpretation of the data contained in contiguous memory cells or addresses of a conventional memory following a predetermined law as will be appreciated by those in the art.

This prior art organization is the cause of various limitations discussed below in an non-exhaustive manner.

It is usually necessary to break down an algorithm described in verbal form or in the form of a flowgraph with a language known as a programming language assembler or compiler into a series of elementary machine instructions and into a series of data with a constant coding format that is more or less complex and often hard to comprehend. This breakdown into machine instruction is most often carried out by automatic means and in this case these means are essentially made up of various assembly or compiler programs, registered in the memory and under the same limitations that they are supposed to help overcome. The best known of such programs of transcoding, assembly, compilation, loading, editing and general control of the totality are part of what is called the software necessary for successful utilization of a computer.

These programs require memory spaces for temporary memorization and storage, additional execution times, additional usage of information input and output devices and thus the cost of their actual realization amounts to a considerable part of the cost or rental of computers.

An exact knowledge of the effective usage of a working digital computer memory, a role actually played by an erasable digital memory with individually addressable cells, is difficult to ascertain particularly if there are multiple programs in the course of pseudo-simultaneous execution (actually on a time sharing basis) and in practice, each of these programs and also each of the simultaneous users of such a computer will have assigned to them arbitrary work memory spaces. These assignments are made in a mechanical way and most often provide more spaces than actually needed.

It is necessary to constantly maintain in such systems the working memory tables of correspondence between program names and data and numerical addresses which thereby reduces the available effective memory space.

Consequently, the small amount of working memory spaces available for a program or a group of data or again for simultaneous multiple users on such prior computers require frequent exchanges between memories with addressable cells, on the one hand, and memories with group addressing, on the other. These group address memories are much more economical, such as memories with magnetic disks that are or are not removable, magnetic tape memories, etc. Considerations such as these are the cause of numerous limitations.

The simultaneous presence in working memory spaces of numerous operating and utilization programs requires the installation of special cable connected devices which, together with specialized programs, prevent interference between programs and data. Locking keys of fixed segments of addressable memories known as pages, special registers for staggering of address coordinates or base registers, creation of instructions known as privileged which are the only ones to execute certain operations on these keys and these bases, are solutions presently proposed and used for the elimination of interferences.

Attempts have been made to eliminate some of these limitations. However, outside of the attempts made by programming and those whose economic advantage remains doubtful, the addition of specialized circuits such as stacks with standard information processing circuits has met with relative failure.

SUMMARY OF THE INVENTION

The first object of the present invention consists in achieving an erasable digital memory with addressable cells (i.e., "words") of arbitrary size with the memory being able to register and to permit the reading therefrom of programs and data.

A second object of the present invention consists in achieving an erasable memory with cells according to the first object and made in the form of chains, each chain being closed and able to be easily registered into or read from the memory in both directions without going outside of said chain at any time. Each chain is made up of indivisible elements called links, all of identical memorization capacity.

A third object of the present invention is to create a single unprogrammed mechanism for creating or merging chains upon a suitable command accompanied by two parameters.

A fourth object of the present invention is to create an unprogrammed mechanism capable of merging of all the chains existing in the memory at the time of application of a command known as initialization.

A fifth object of the present invention is to provide a mechanism which by means of suitable commands, will permit the reading or writing in links of a chain specified by a parameter in one direction or the other, depending on the command.

A sixth object of the invention is to provide means which, by means of a specified use of said memory, enables knowledge with precision of the moment when the memory with cells of variable size is entirely occupied.

A seventh object of the invention is to provide means to reach without a programmed assembly system, any information designated by a name that is proper to it and to be able to reach this information only by the name that is proper to it, thereby assuring protection against interferences between multi uses of a common memory.

An eighth object of the invention is to benefit from the structure of the memory as it presents itself to the user or user organs to solve effectively certain problems of direct interpretation or compilation of the expressions subjected to specified syntactical rules.

A ninth object of the invention is to use this type of memory in problems of temporary memorization between senders and receivers of informations that are aperiodic and of variable length.

A tenth and last object of the invention is to facilitate considerably the creation, maintenance and use of the data in the form of files registered in the memories according to the invention or in grouped address memories, particularly magnetic registering disks.

In what follows, a conventional memory with ordered cells or words individually registrable or erasable by addressing is called the cell memory.

A first important means of the present invention consists in associating, on the one hand, a conventional cell memory provided with its command, access, control and feed organs and, on the other hand, a unique device of logical circuits and memorization elements called the memory control device, without in any way modifying the cell memory so that as far as a user or using organs (devices) are concerned, the totality appears as a memory with erasable or registrable cells of various size, addressable by the content and memorizing information in the form of closed chains that are symmetrical or not at a rate of such a chain per cell of variable size, the elements of said chain being called links.

A second important means of the present invention consists in grouping all the organs of the control device so that the latter appears as an autonomous device, possibly detachable, connected electrically to the cell memory by a single cable (also possibly detachable) containing all and only the wires of the usual electric signals of command, access and control of the cell memory of the type currently used. Henceforth, this cable will be called the connecting cable.

A third important means of the present invention consists in grouping all the electric signal wires of command, access and control of the totality made up of the control device and cell memory so that this totality appears to users or using organs as a single organ accessible from the viewpoint of command, access and control by a single totality of electric signal wires called hereafter command and use cable.

A fourth important means of the present invention consists in arranging the control device so that, by its action, each memory cell is assigned to one link of a determined chain, said link containing a fixed number equal to or greater than three segments, each segment being able to memorize a determined number of binary data, the combination of data of these elements being at times able to correspond, if desired, to a whole number in binary form or, at times to a code used to represent desired symbols according to norms or coded representation conventionally used with such a memory as will be apparent to those in the art.

Each link contains two segments containing, systematically, the addresses in memory (in binary form) of the adjacent links of the chain. The remaining segment further contains the binary coded representation of one or more consecutive symbols or numerical information data from a series of such data elements. The corresponding segment of adjacent links in this same chain contains (in the same coded way) one or more of the further consecutive symbols in the series occurring on both sides of the above first-mentioned group of information or data symbols. The last symbol of the information being considered as preceding the first symbol and each link specifying the addresses of its two neighbors. The information is thus contained in a chain that is called closed and symmetrical, these characteristics being assured by the arrangement of the control device of this invention as will become more apparent below.

A fifth important element of the present invention consists in arranging certain logical circuits and certain memorization elements of the control device into a circuit generating a finite, fixed sequence of electric signals, with time characteristics determined by those of the various operations of the cell memory, so that, in response to a command known as "chaining" (associated with two addresses previously registered in two memorization registers provided for this purpose and being part of the control device, as parameters defined by the user or the user organs and the totality suitably transmitted in the form of coded electric signals), by means of specialized wires of the command and use cable, said circuit generating the sequence arranges, according to rules known to those in the art, a sequence of transfers between the registers of the control device and the cell memory. This sequence modifies the contents of the chaining segments of certain links so that at its end a new chain will have been created from certain consecutive links of another chain if the two chaining parameters are addresses of links belonging to this other chain. Alternatively, two chains will be merged into one if the two chaining parameters are addresses of links belonging respectively to each of these chains.

A sixth important means of the present invention consists in arranging in the control device a special logical circuit for generating a finite, fixed sequence of electric signals with time characteristics determined by those of the various operations of the cell memory, so that in response to a series of repetitions of a reading command (associated with a permanent command of positive direction in the first place, all suitably transmitted in the form of coded electric signals by means of specialized wires of the command and use cable), reading of the successive links of a chain is obtained from the link specified by the appropriate address in the address register of the cell memory at the time of the first reading command.

By "reading" it is understood that, according to conventional use, the content of the address cell specified by the content of the address register at the time considered is transferred according to a sequence usually known as reading cycle from the cell memory into a specialized register used for accessing said memory.

By "writing", it is understood, according to common use, that the content of the specialized register for accessing the cell memory is transferred according to a sequence usually known as a writing cycle into the address cell specified by the content of the address register at the time considered.

Seventh, eighth and ninth important means of the present invention consist in arranging in the control device special logical circuits for generating circuits similar to that which and, characterizes the sixth means and in response to a series of repetitions of the reading command (associated with a constant command in the negative direction in the second place), in response to a series of repetitions of writing command (associated with a constant command in the positive direction in the third place), in response to a series of repetitions of the writing command (associated with a constant command in the negative direction in the fourth place), all suitably transmitted in the form of coded electric signals by means of specialized wires of the command and use cable, a reading in the negative direction is obtained in the second place, writing in the positive direction is obtained in the third place and writing in the negative direction is obtained relative to the successive links of a chain from the link specified by the appropriate address in binary form in the address register at the time of the reading and writing commands.

A tenth important means of the present invention comprises a binary counter means according to conventionally known rules in the art from logical circuits and binary memorization elements, the counter being part of the organs of the control device. By a series of transfers between said counter and the memorization registers of the chaining parameters (triggered by a command known as initialization, suitably transmitted in the form of electric signals over one of the wires of the command and use cable), addresses are caused to be registered in the segments of the memory cells reserved for chaining addresses, such addresses insuring that all the memory cells are then links of a single chain, said links being placed in normal numerical order of their addresses or locations in the cell memory.

An eleventh important means of the present invention comprises a logical circuit control device reacting to the presence of two identical binary numbers in the address register and a segment of the information chaining present in the access register of the cell memory at a given moment, the corresponding electric signal being suitably transmitted to the user or using organs by a specialized wire of the command and use cable.

A twelfth important means of the present invention consists in arranging the control device so that a fixed address cell, not specifiable by the user or using organ will be considered as the initial link of the chain resulting from the action of the initialization command.

A thirteenth important means of the present invention consists in arranging logical devices in the control device of this invention so that the simultaneous application of the "positive" and "negative" commands eliminates the symmetrical character of the chains. Under the action of such simultaneous signals, the content of one of the chaining elements loses all chaining significance and becomes available for information storage in the conventional manner if properly so-called.

All other memory commands remain and their effects are identical except that there is now only one direction of writing or reading in a chain.

The link segment assigned to the mode of use in chaining chains in a single direction is the one whose content, when it appears in the access register of the cell memory, is compared by the logical circuit (the eleventh means of the invention), with the content of the address register which has the effect of causing the signal described in this means to play the same role it plays at the time of use in chains with chaining in both directions.

The following description, given by way of nonlimiting example, refers to the accompanying drawings.

DESCRIPTION OF THE PREFERRED EMBODIMENT

Figure 1:
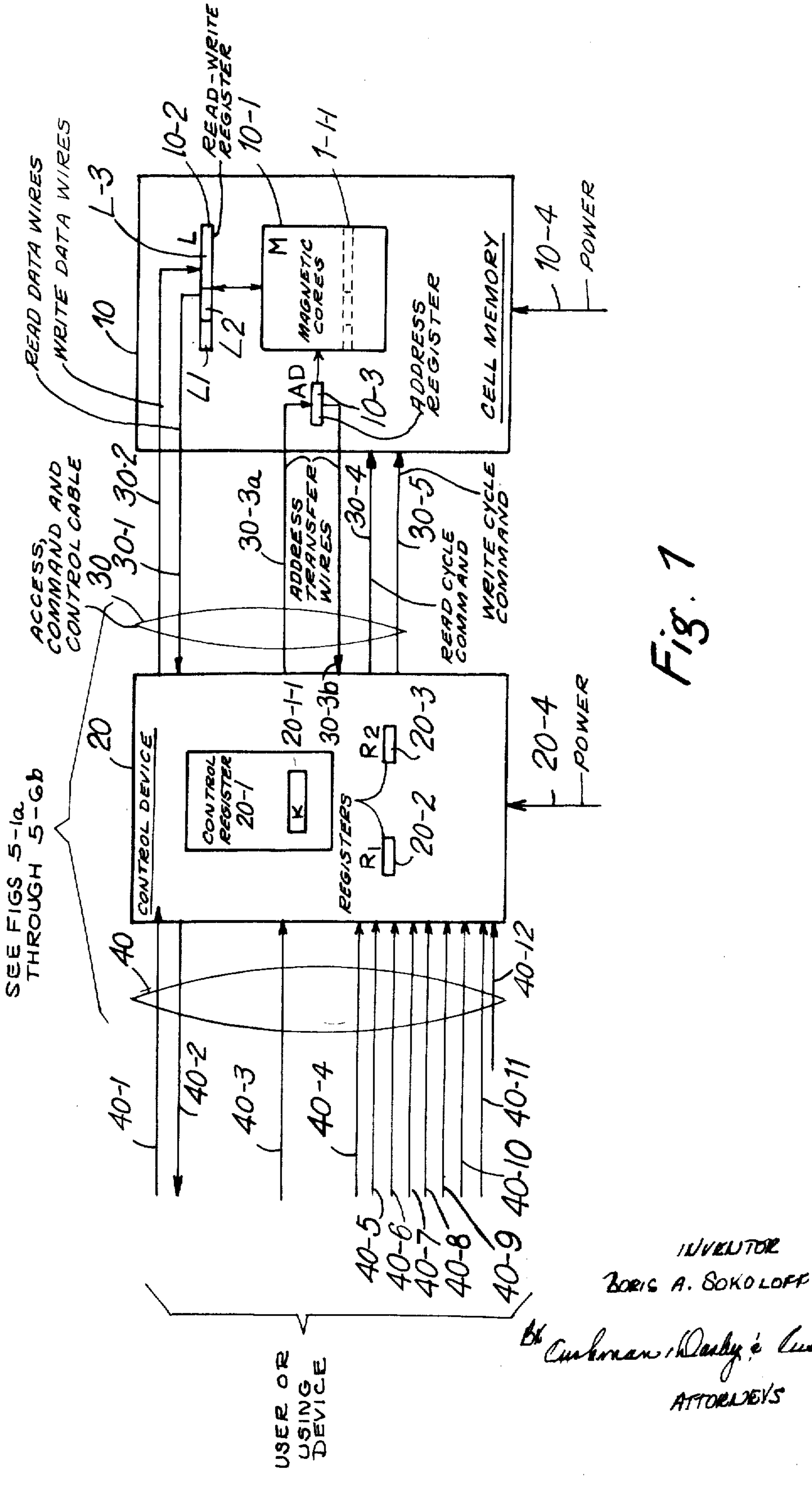
FIG. 1 is a general block diagram of an ensemble grouping of a cell memory, a control device, a connecting cable, a command and use cable and possibly power supply cables according to this invention.

FIG. 1 is a block diagram of association for the control device 20 which is connected by cable 30 to cell memory 10 and this ensemble is then accessible to the user or using organ by cable 40.

Cell memory 10 is, by way of nonlimiting example, of the current type with magnetic cores placed in parallelepipedic arrangement 10-1, writing or reading in the cells of K cores, K being a whole number representing the number of binary bits in a memory word, is performed by means of a register 10-2 with K binary elements, most often with semiconductor trigger circuits.

Cable 30 contains all the wires of access, command and control usually used according to current practice, while the register with semiconductor trigger circuits 10-3 contains in binary form the address of the cell it is desired to reach, that is, 10-3 is the usual address register.

In the same practice, the number K of elements by cells can vary, depending on the models, from 18 up to 64, just as the number N of cells can vary from 64 up to several million. To clarify the explanation and solely for this purpose, it is assumed in this description that there are 256 cells of 32 elements and that consequently register 10-3 known as the address register should be made up of eight elements. More generally, P number of elements of address register 10-3 is linked to N number of cells by $2^P = N$.

Cable 10-4 brings to memory 10 the electric power it needs to operate.

Cable 30 contains all the wires necessary for the use of memory 10, and, in particular, a group of K wires 30-1, making it possible to read the content of access register 10-2, a group of K wires 30-2 making it possible to register (write) binary information (data) into the K elements of the read-write register 10-2, a group of P wires 30-3*a* making it possible to register (write) binary information (address data) in the P elements of address register 10-3, a group of P wires 30-3*a* making it possible to read the content of the same register, a reading cycle command wire with regeneration (or nondestructive) 30-4, a writing cycle command wire 30-5, and possibly return power wires of the above mentioned wires.

The usual circuits of address selection, writing and reading amplifiers have not been described here, it being understood that the invention is not concerned in any way with the constitution itself of the cell memory and circuits which are closely associated if not an integral part for its regular operation.

Cable 30 is manually or automatically detachable and for this reason the user always has the option of using the cell memory in a conventional way absolutely independent of the control device 20. In the same way, control device 20 which is the main means of the invention can be connected automatically to one of the memories of an ensemble of several identical memories.

Control device 20, the main means of the invention, has the task of performing the objectives described above. In particular, it operates so that, as far as the user or user organs are concerned, the association of the control device 2, and cell memory 1 is commandable, accessible and controllable by means of cable 4 to the extent that it can be considered as an erasable memorization device with cells of arbitrary size. The cell size is actually fixed by the size of the information (data) they contain with the cells being known as chains whose sub elements are "links".

An information (data) is, by definition, any series of symbols which is supposed to be used or which is the result of a use and which for this purpose is to be registered in a memorization system.

By way of nonlimiting example, the series of symbols −16.1 × 6 → X 1 is considered as information which specifies according to a particular convention cited by way of example that the product of −16.1 × 6, i.e., −96.6 is assigned to the variable with the name X 1.

It should be noted in passing that this series of 10 successive data elements is, in the standard information processing, entered into a memory under a form of editing (or of input/output transformation). In this case, the successive characters of a similar series will, with appropriate coding, usually be registered in consecutive cells (consecutive coordinates) of a cell memory, and generally at a rate of *q* characters per cell, *q* being able to have a value of 1, 2, 3, 4, 8.

When this series of data elements is subjected to the various phases of conventional data processing, it loses all resemblance to its initial form and in particular the usual compiling and assembly programs transform it into two series of instructions and data with constant format, both placed in groups of consecutively accessed memory cells.

Thanks to the action of the control device of this invention, the above information (which comprises 10 symbols), can be placed in a memory cell of exactly identical size, i.e., 10 which, to avoid any confusion is called a chain. Thus, the memory space is more effectively utilized.

To simplify the example given, each element of the chain or link contains a single symbol (data element) but the control device of this invention will just as easily work if each link contains 2, 3, 4 or *n* consecutive symbols or data elements.

Figure 2:
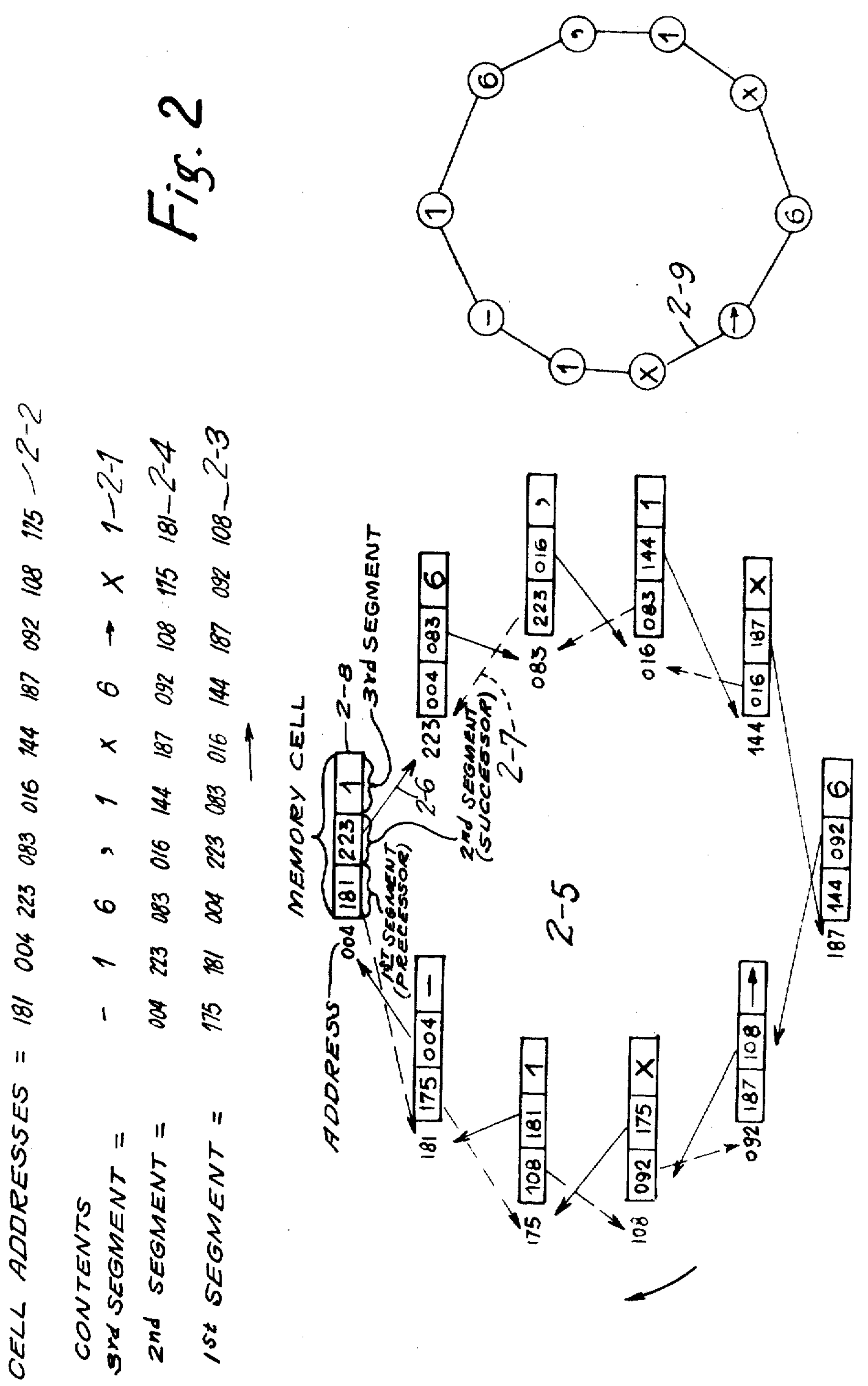
FIG. 2 depicts two diagrams accompanied by a table and all representing a nonlimiting example of a chain containing the various symbols of an information or string of data elements.

Referring to FIG. 2, the various symbols (data elements), used as an example, are placed in various cells of the cell memory, more particularly in a third segment of each all, which segment is devoted to this use. The addresses of the cells (thus each containing a single symbol) are of any conventional kind but still without repetition and between 000 and 255 in actual number for the example being discussed.

As will be explained below in regard to the reserve chain, these addresses result from multiple exchanges between said chain and the various other chains and their series is not arranged in the arithmetic direction and they are therefore not automatically contiguous in the normal access sequence of the cell memory.

Thus, the first information symbol, a "minus" sign, is placed in the third segment of address cell 181, the second information symbol "1" is placed in address cell 004 and so on.

The series of symbols is thus represented at line 2-1 in the table in FIG. 2 and that of the corresponding addresses at line 2-2. The second segment of the address cell 181 which contains the symbol −, in turn contains the address in the cell memory, of the cell containing the following symbol 1, i.e., 004, and it is the same for all of the 10 cells occupied by the 10 information symbols, represented in their normal order which has nothing to do with their conventional access order in the cell memory. At lines 2-4 in FIG. 2 therefore will be found the addresses of the "successors" and in particular address cell 175, containing the last symbol 1, gives as the succession address that of the cell where the symbol − is contained, i.e., 181. This is why the chain is called closed. It can immediately be seen that it is therefore possible to read the information in its natural order by consulting at each link the address of the successor link.

Nothing indicates in the closed chain the beginning of the information.

For that, it is customary to use in the information itself special symbols known as separation, if necessary. Moreover, the using organ or user should of necessity memorize the address of the first and last symbol of the information externally to the chain memorization ensemble.

At line 2-3 in FIG. 2, a second list of addresses, each occupying the 1st segment of the corresponding cells indicate the addresses of the "predecessors".

After having noted that the predecessor of the first symbol (—) is the terminal symbol 1, it is sufficient to note that the list of the first segments makes it possible to read the information in the negative direction, opposite the natural direction, the latter corresponding to the positive order.

A different representation is given at 2-5 in FIG. 2 in the form of chains. Each link is represented in the form of an ensemble of three segments devoted in the order of negative chaining, to the positive chaining and information itself. To the left of each of the links is the corresponding address of that of the cell of the cell memory. Solid arrows 2-6 indicate the relation between the content of the second segment and the successor link, just as broken arrows 2-7 correspond to the relation between the content of the first segment and the predecessor link.

The third segment, one of which is indicated at 2-8, contains an information symbol.

A more simplified representation at 2-9 will be used below, it being understood that each link contains, besides one or more symbols of information — a single one symbol in the nonlimiting example considered here — the addresses of the predecessor and successor links.

It is quite obvious from what has been said that the cells containing the information are distributed geographically in the memory at random.

Reading or registering in a chain is therefore a relatively simple mechanism consisting in placing in the address register of the cell memory the content of the first or second segment of the current link as will be defined below but this possibility implies a mechanism for creating or merging chains which will be understood by referring to FIG. 3.

Figure 3:
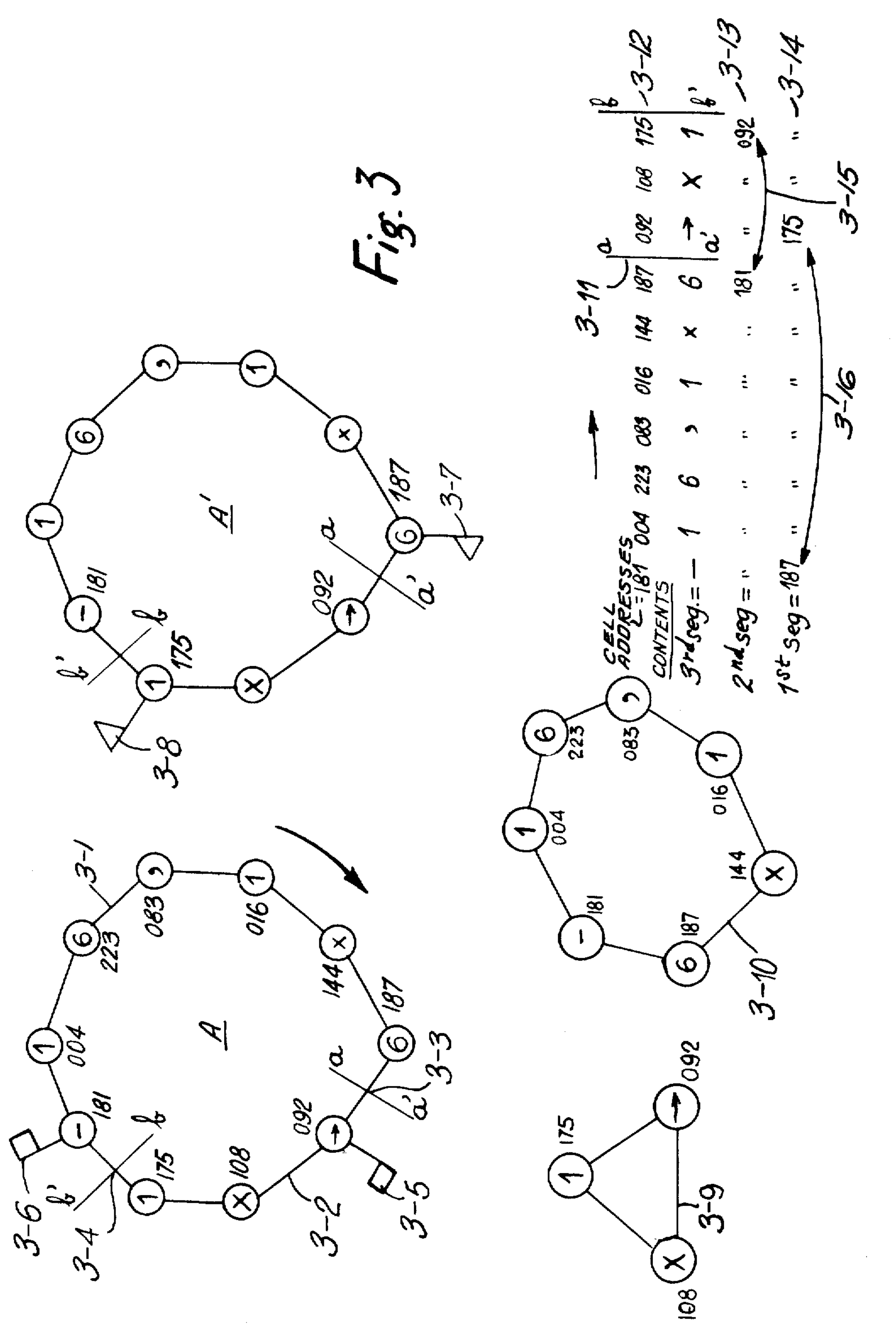
FIG. 3 is a group of 4 diagrams and a table illustrating the process of creating a new chain.

This FIG. 3 illustrates by way of nonlimiting example the creation of two chains from a single chain A (or A'): the chain corresponds to series 3-1 of the symbols −16.1 × 6, while the second chain corresponds to → X 1, a series indicated by 3-2.

Two breaks *aa'* and *bb'*, represented at 3-3 and 3-4, correspond to the first series −16.1 × 6 and the second series → X 1 as they stand in a single chain before their closings into two separate chains.

These two breaks can be specified in two ways: first by the addresses of the cells containing the symbol — and the symbol → , i.e., by 181 and 092, addresses located immediately in the positive direction beside the breaks and corresponding links carry, only by way of representation, flags 3-5 and 3-6, the second by the addresses of the links containing symbols 6 and 1 of cell addresses 187 and 175 carrying triangular flags 3-7 and 3-8 as shown in chain A'.

These two ways are absolutely equivalent because the chain has no preferential direction in itself.

On the contrary, to specify the two chains by " → " and 1 of addresses 092 and 175 or by - and 6 addresses 181 and 187 offers no advantage as will be made more clear below, since it will involve merging two chains each defined by a parameter.

The newly created chains are represented at 3-9 and 3-10 after closing.

This closing is effective when a determined mechanism, a means of the invention, has proceeded to cause four exchanges between the contents of certain segments of the chained cells: in particular, the contents of the second segment of address cells 187 and 175 (symbols 6 and 1) both located in the negative direction in relation to break lines *aa'* and *bb'* at 3-11 and 3-12, are exchanged and the same goes for the contents of the 1st segment of address cells 092 and 181 located in the positive direction in relation to the same break lines. The final result is indicated at lines 3-13 and 3-14, in the table in FIG. 3, the quotation marks indicating the absence of modification in relation to the numbers indicated in lines 2-3 and 2-4 of FIG. 2. The exchanges just discussed are diagrammatically depicted at 3-15 and 3-16 of FIG. 3.

This mechanism is performed by a fixed, finite series of transfers between different registers. Referring to FIG. 1, read-write register L (1-2) is segmented as already indicated into three elements called L1, L2 and L3 corresponding to the first, second and third segments already discussed. Address register AD 10-3 specifies by its content the address of the cell of memory M 10-1 which will be transferred to read-write register L or 10-2, if a reading cycle is involved, or transferred from L to the addressed cell, if a writing is involved, both transfers being represented in notation by reading: L ← M [AD ]
writing: M [AD] → L the symbol ← designating a unilateral transfer of the content of the register or cell cited to the right of said symbol to the cell or register cited to the left. Control device 20 of FIG. 1 contains two registers R1 20-2 and R2 20-3 intended mainly for memorization of the essential chain parameters, i.e., the addresses specifying breaks *aa'* and *bb'*.

These breaks are specified here, solely by way of nonlimiting example, by the addresses of the contiguous cells in the negative direction or cells 187 and 175, as indicated in FIG. 3 by triangular flags 3-7 and 3-8.

To gain time, two or three transfers, at times reciprocal, are performed simultaneously. This will be the case in particular of reciprocal transfers AD ← R2 and R2 ← AD performed at the same time as R1 ← L2 (third line of Table I below). In this case, it is assumed, according to the existing rules of the art, that the characteristics of the memorization elements of the registers involved permit it (and this is often the case of semiconductor trigger circuits achieved with the aid of single phase circuits) to be by a man skilled in the art. In the contrary case, the means of the invention is *not* at all essentially modified if, for example by the use of an additional register S, the two simultaneous and reciprocal transfers are replaced by:

S ← R2
R2 ← AD
AD ← S

Assuming that registers R1 and R2 are loaded at 187 and 175, a way of saying that the decimal transcription of the contents of R1 and R2 are actually equal to 187 and 175, the performance of the series of above transfers ends in the result sought.

TABLE I

| Transfers | Partial Results | Phase No. (later explained) |
|---|---|---|
| AD← R1 | AD=187 | 9 |
| L← M [AD] | L=144 092 "6" | 10 |

TABLE I-Continued

| Transfers | Partial Results | Phase No. (later explained) |
|---|---|---|
| R1 ← L2; AD ← R2; R2 ← AD | R1=092; AD=175; R2=187 | 11 |
| L ← M [AD] | L=108 181 "1" | 12 |
| R1 ← L2; L2 ← R1 | L=108 092 "1"; R1=181 | 13 |
| M [AD] ← L | M [175]=108 092 "1" | 14 |
| AD ← R2; R2 L2 | AD=187; R2=092 | 15 |
| L ← M [AD] | L=144 092 "6" | 16 |
| L2 ← R1 | L=144 181 "6" | 17 |
| M [AD] ← L | M [187]=144 181 "6" | 18 |
| AD ← R1 | AD=181 | 19 |
| L ← M [AD] | L=175 004 "—" | 20 |
| R1 ← L1; AD ← R2; R2 ← AD | R1=175; AD=092; R2=181 | 21 |
| L ← M [AD] | L=187 108 "→" | 22 |
| R1 ← L1; L1 ← R1 | L=175 108 "→"; R1=187 | 23 |
| M [AD] ← L | M [092]=175 108 "→" | 24 |
| AD ← R2; R2 ← L1 | AD=181; R2=175 | 25 |
| L ← M [AD] | L=175 004 "—" | 26 |
| L1 ← R1 | L=187 004 "—" | 27 |
| M [AD] ← L | M [181]=187 004 "—" | 28 |

The partial results appearing at the right make it possible to follow the effects of the transfers step by step.

The sign = indicates that once the corresponding transfer is finished, the decimal transcription of the binary number contained in the register indicated at the left of the sign = has as a value the number at the right of the same sign.

Thus, in the example considered, the content of R1 is equivalent to 187, that of R2 to 175 and when transfer AD ← R1 is completed, it is permissible to write AD = 187 and so forth.

It is understood that it would not be going outside of the scope of the invention, if R2 ← AD; AD ← R2 were replaced by a series of three transfers using the additional register S, and, in general, any sequence of transfers either longer or using more registers but arriving at the same result can replace the sequence described above and remain a means of the invention.

Figure 4:
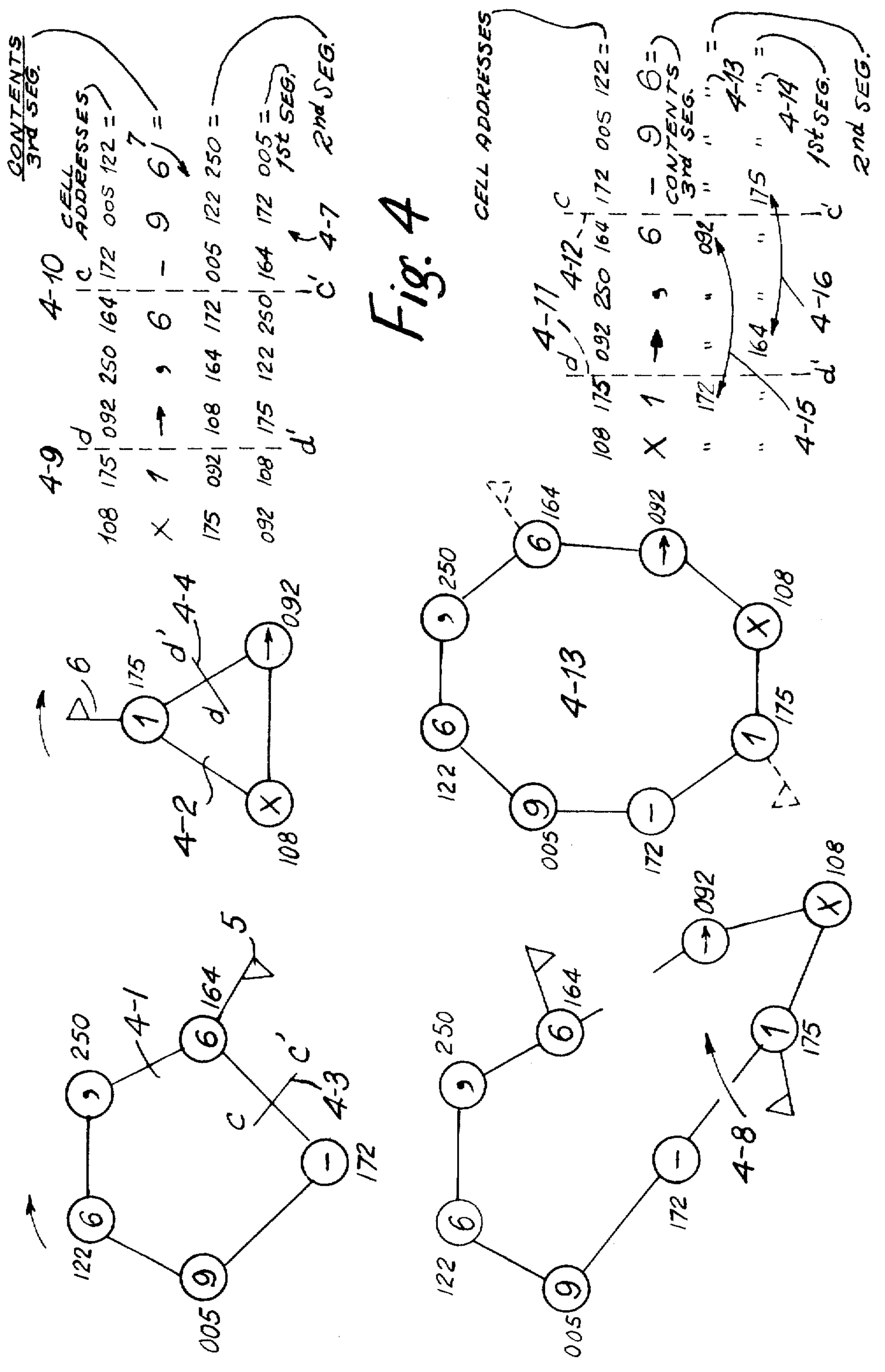
FIG. 4 is a group of 4 diagrams and 2 tables illustrating the process of merging two chains; and FIGS. **5-1*a*, 5-1*b*, 5-2, 5-3, 5-4, 5-5, 5-6*a*, and 5-6*b*, illustrate an exemplary embodiment of a control device constructed according to the invention.

The same series of transfers is used when a merger of two chains is involved. Referring to FIG. 4, two closed chains 4-1 and 4-2 contain respectively series —96.6 and → X 1.

To merge the separate two chains first of all requires the definition of the previous breaks in both, which (in regard to the choice of parameters) may be accomplished by retaining *not* two parameters or addresses (as done with splitting relating to a single chain) when taking into account the fact that it involves using the same mechanism as that of the creation of a chain as will be explained in more detail below.

It can therefore be assumed that the break *cc'* (4-3) defines an unclosed series —96.6 and that break *dd'* (4-4) defines another unclosed series→*X*1, both represented at 4-8.

A concatanation of —96.6 to → X 1 (or → X1 to —96.6) then a closing brings about chain 4-13 containing —96.6 → X 1 (or any formula deduced by rotation such as 96.6 → X 1 —; 6.6 → X 1 — 9, etc.)

Table 4-7 indicates the general state of the two chains before merger and it should be noted that the content of this table does not depend in any way on the order of its columns. The breaks are represented at 4-9 and 4-10 and at 4-11 and 4-12.

Lines 4-13 and 4-14 represent the contents of four modified segments, in comparison with the corresponding placements of table 4-7 and this modification comes down to exchanging the contents of the second segments of the address cells 175 and 164 (these addresses are parameters of definition of the merger) and those of the first segments of cells 092 and 172 as indicated at 4-14 and 4-16.

The definition of a merger does not go outside the invention if the parameters selected correspond to the cells contiguous to the breaks in the positive direction.

In summary, registers R1 and R2 being loaded by two values representing addresses, the performance of the sequence of the transfers indicated above leads in Table I to a merger if the two addresses are those of links belonging to two chains and to a creation (or parthenogenesis) if the chains belong to the same chain.

This definition of chains, of their parameters, of the sequence of transfers is a means of the present invention.

It will be noted that —96.6 has replaced —16.1 × 6.

The information has therefore taken a simpler form by substitution of a number for a product of two others. Step by step, it is thus possible to replace complicated expressions by their values if they exist, and this is an important part of the objectives of information processing. This is the eighth object of the invention.

Registering in the association of standard means, invented and represented in FIG. 1, figures or expressions or more generally series of symbols assumes that the corresponding links are borrowed from a chain, one of whose addresses always remains known regardless of the evolutions of the chain which is called a "reserve". Actually, the links are borrowed from it but others are given to it and in an unforeseeable manner.

The means of the invention further comprises incorporating, as the user desires, all the memory cells in a unique chain known as the reserve chain. To do this, an initialization mechanism causes the registration in the segments of such numbers that all the memory cells are arranged according to their normal assembly. Address cell 000 is "chained" to cell 255, on the one hand, and 001, on the other hand; cell 001 is chained to that of address of 000 and 002, 002 to 001 and 003 and so on until cell 255 chained to 254 and 000. This example is, of course, not limiting and covers every memory capacity judged necessary for a particular system application.

The initialization mechanism can be described by using the same notation conventions by the following sequence of transfers:

| | Transfers | Phase No. (to be explained later) |
|---|---|---|
| | R1 ← 255; AD ← 000; R2 ← 001 | Phase 1 |
| R2 ≠ 000 (loop back ↓) | L1 ← R1; L2 ← R2 | Phase 2 |
| | M [AD] ← L | Phase 3 |
| (loop) | R1 ← AD; AD ← R2; R2 ← R2+1 | Phase 4 |

The simultaneity of the transfers is indicated by the symbol;

The first line is an initial loading of R1, AD and R2 by 255, 000 and 001.

The last part of the fourth line represents the addition of a unit to the content of R2. During the first rotation the value of R1 becomes 000, that of AD 001 and that of R2 002 and so forth, as long as R2 is not again equal to 000. It should be noted that 255 1 = 000 (and not 256, since it involves an addition modulo 256). If R2 = 000, there is a stop indicated by STOP to the reader and physically by a stop of the initialization transfers.

The mechanisms described such as creation and merger of chains, initialization and other mechanisms, as the detail of the specific actions of the various commands transmitted by wires 40-1 to 40-11 of FIG. 1 are the object of the following description, since the notions attached to the concept of chains have been made sufficiently clear.

Functioning of the control device can be broken down into 29 phases in regard to its principal part.

To make the explanation clear, these phases have been numbered from 0 to 28.

They use a sequential controller whose main element is a register K with five memorization (binary valued) positions if reference is made to FIGS. 5-1*a* through 5-6*b* in what follows.

Each phase corresponds to a unique state of said register and reciprocally.

To clarify the explanation still more, the state of register K with five positions will be linked to the number of the phase by simple binary correspondence with slight weights to the right, but it is understood that an effective embodiment could use any other biunivocal correspondence between the phase numbers and the figure with five binary elements.

The 29 phases will therefore be described essentially by the actions which are specific to them and by the states of the register K which is devoted to them as an accessory.

Phase 0 (Table II)

Phase 0 corresponds to the state of latency in which no internal action depending on the sequential control can take place.

In the example selected, the corresponding code of register K will be 00000.

If there is no action of external origin register K should retain code 00000 and the only internal action consists in registering 00000 in said register.

Phase 1

Phase 1, selected arbitrarily by an external IN signal, results from an external command and comprises loading three registers R1 AD and R2 with binary quantities 1111 1111, 0000 0000 and 0000 0001, the action of initial loading of the registers being part of the initialization mechanism, of the memory unit and the control device of this invention.

During this phase 1, register K receives code 00010, to start the following phase whose number is 2.

Phase 2

The 1st segment of the register L, L1 (eight binary bits in length) receives, element by element, the content of register R1, the second segment L2 receives that of R2. At the time of the first passage by this phase, that will correspond to 1111 1111 and 0000 0001, whose decimal translation is 255 and 1. At the second passage, these contents will be 0 and 2, at the third 1 and 3 and so on, phase 2 loads segments 1 and 2 of L, while the corresponding address is 0 then 1 then 2, etc. Finally, register K receives the code of the following phase — 3 —.

Phase 3

This phase triggers a writing cycle of the content of register L in memory M. At the first passage, the writing address is 0 and the data to be written in L1 and L2 is 255 and 1. At the second, at writing address 1, the data is 0 and 2. At the third at writing address 2, the data is 1 and 3. This phase links in both directions all the cells of M.

Register K receives the code of the following phase — 4 —.

Phase 4

During this phase, the contents of registers AD and R2 are transferred in registers R1 and AD then that of R2 is increased by one unit. At the first passage, R1 and AD receive the binary equivalent of 0 and 1 then the unit increment of the content of R2 cause the decimal equivalent of this content to become 2. At the second passage, R1 and AD receive 1 and 2 while R2 takes the value 3 and so on.

With certain exceptions, register K receives the code of phase 2, which makes it possible to repetitively perform the successive passages mentioned above. The exception will occur when the decimal equivalent of the content of R2 is 0 and in this case, register K produces the code of phase 0. The sequential device then returns to the state of latency from which it can be drawn only by external action.

It will be noted that control of the content of R2 is applied to the content of R2 before addition performed during phase 4. The phase during which R2 = 0, AD = 255 and R1 = 254 is therefore actually performed in the sense that at address 255 of memory M will be found L1 = 254 and L2 = 0, although the terminal state of registers R1 AD and R2 will be defined by 255, 0 and 1.

In summary, the process of initialization which repeatedly puts phases 2, 3 and 4 into operation after its own initialization by phase 1, chains all the cells of memory M and prepares registers AD and R2 particularly for a writing in said chain followed, as will be shown, by the possibility of isolating in the form of a second separated chain the data which will then be written, since R 2 will actually contain a chain creation address.

Phase 5

Phase 5, like phase 1, results from an external command. In the case of this phase, the command in question is that of a writing in a link of a chain.

The direction in which said chain is read depends on logical variables D and R (positive, negative).

If both these latter are zero, the reading is that of the link specified by the address previously contained in register AD.

On the contrary, if variable D is not zero, register AD is loaded by the content of the second segment of L which, by repetition of the command, makes possible the reading of a chain in the positive direction. Finally, if variable D is zero, while R is not, the first segment of L intervenes which, by repetition of the command, permits the reading of a chain in the negative direction. Register K further receives the code of the following phase.

Phase 6

Phase 6 triggers a reading cycle without erasure of memory M while register K is loaded with the code of the latency phase 0.

Phases 7 and 8 are identical with phases 5 and 6, except the cycle of return to phase zero and writing of memory M is commanded rather than reading.

Phases 9 to 18 are described in broad lines in Table I of the present document. However, it should be noted that the transfer L ← M [AD] which specifies a reading is noted here and later by LE (reading). Also M [AD] ←L is abbreviated by EC (writing).

Each phase further comprises the transfer of the code of the following phase into register K.

It should be noted that phases 9 to 18 modify the second segments exclusively; they therefore relate to positive chaining.

After phase 18, the content of R1 and R2 corresponds to the cells following the positive direction, cells whose address was previously contained in R1 and R2. These new addresses are used as initial addresses of negative chaining, which is exclusive to the series of phases 19 to 28. The latter, after having consequently modified the first segments of the interested cells, register in R1 and R2, the address of the cells preceding the cells of intermediate addresses stored at the output of the sequence of phases 9 to 18. On the whole, the content of registers R1 and R2 therefore remain unchanged, which is an important property and a claim of the present invention. Moreover, each half sequence 9 to 18, 19 to 28 can be used alone and this is actually the result of the half-chaining command, a consequence of the application of a suitable command signal 43 examined below.

Figures 1A, 5:
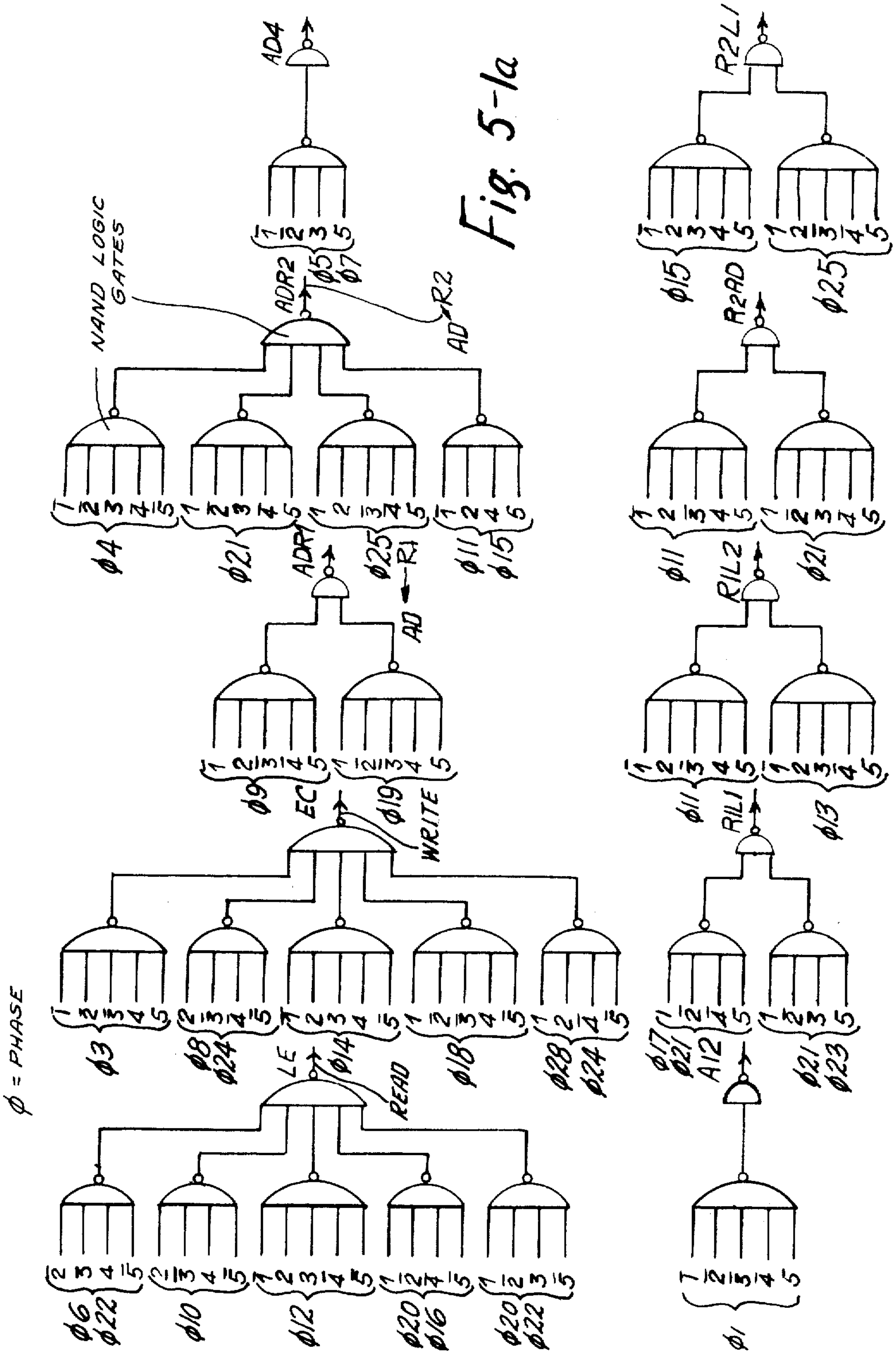
FIGS. 5-1*a* through 5-5 are schematic illustrations of logic controlling gates and FIGS. 5-6*a* and 5-6*b*** are schematic illustrations of the interconnections between devices shown in other figures and other elements of the control device.

Referring to FIGS. 5–6*a* and 5–6*b* (which can be combined into a single drawing along line A-B), the main functions are represented in the form of functional sub-ensembles, of unspecified technology, but whose embodiments are given by FIGS. 5–1*a,* 5–1*b,* 5–2, 5–3, 5–4 and 5–5.

A collection of eight identical trigger circuits (flip-flops) plays the role of R1, another that of R2 and finally 5 trigger circuits play the role of register K as should now be apparent.

Figures 1B, 5:
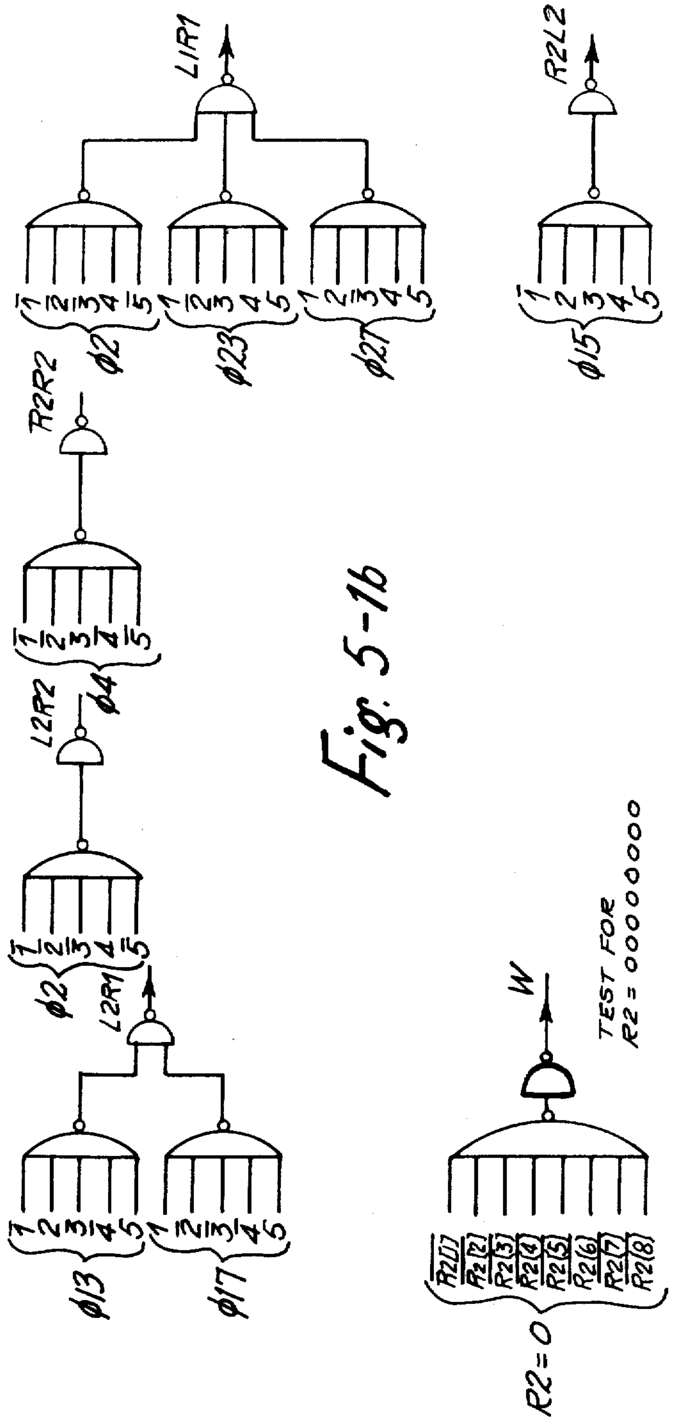
Figures 3, 5:
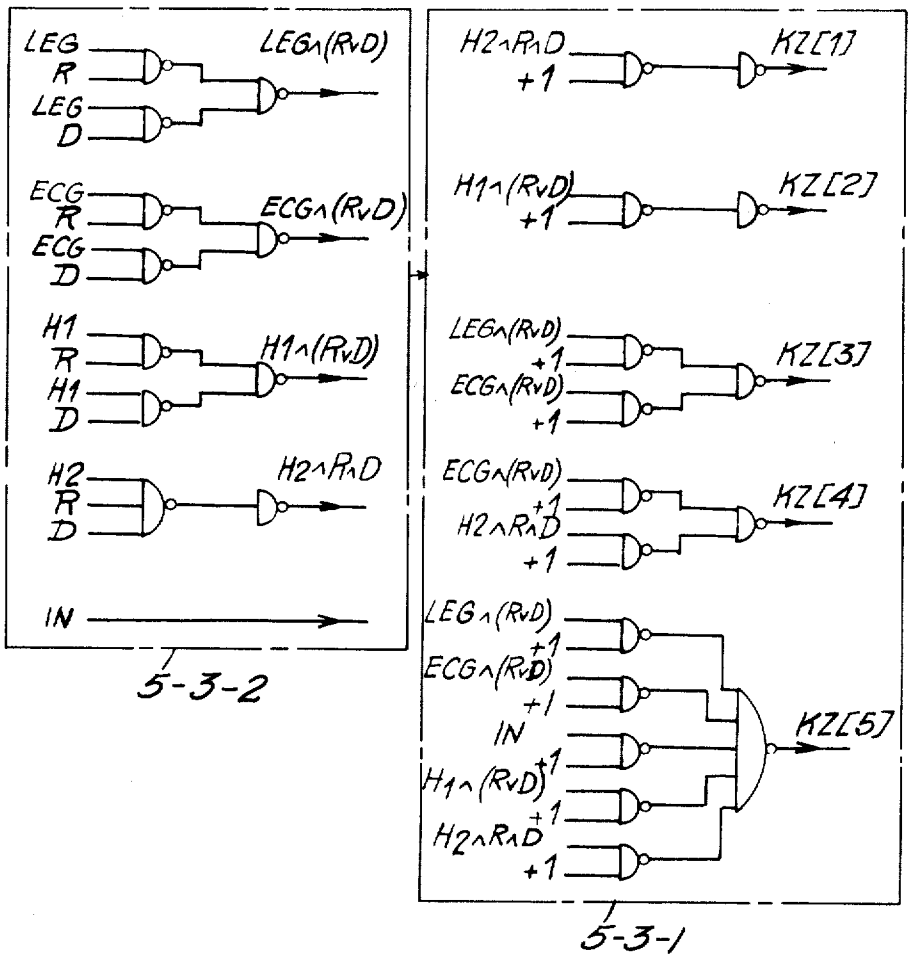
Figures 4, 5:
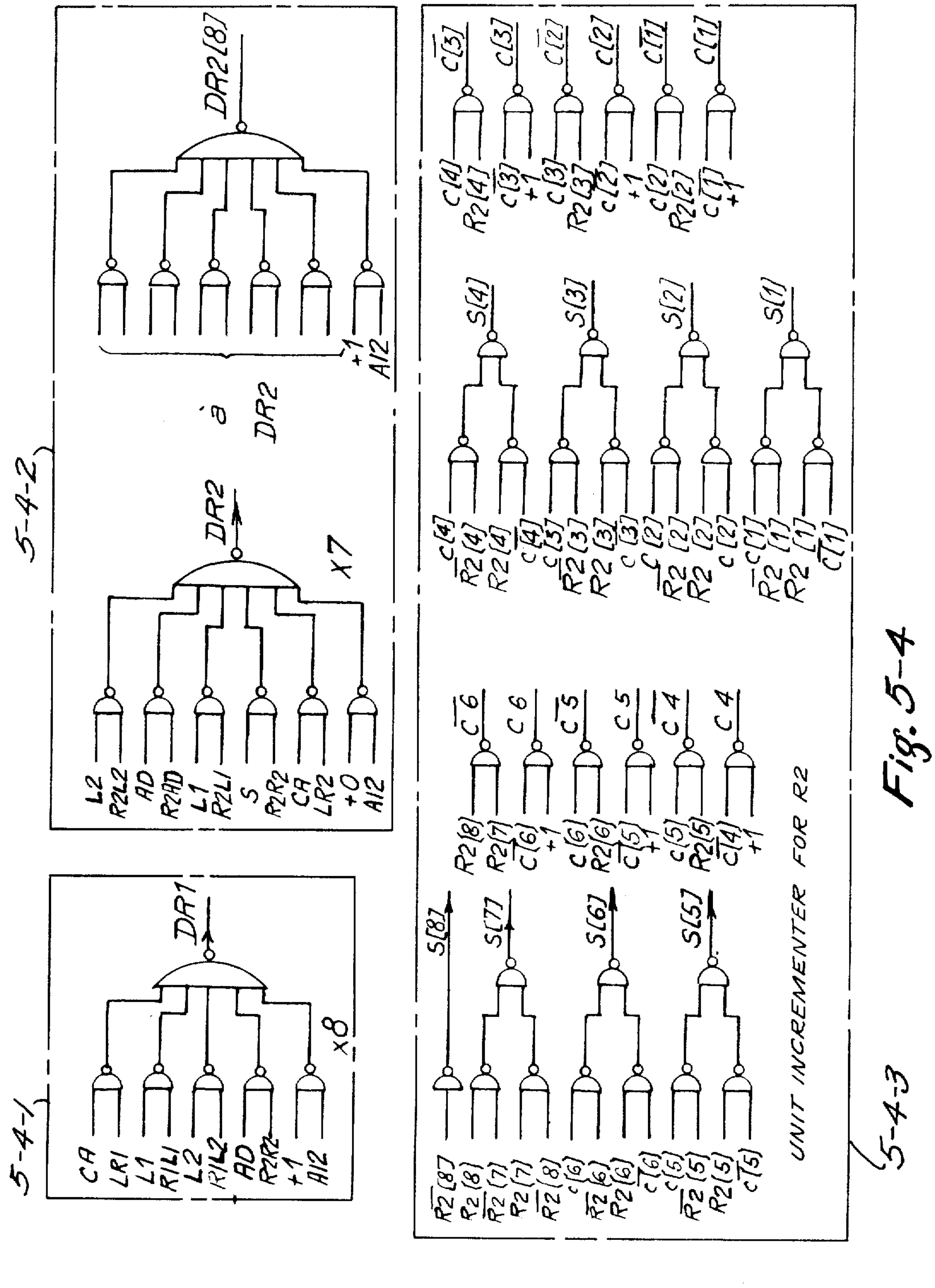
Figures 5, 6, 6A:
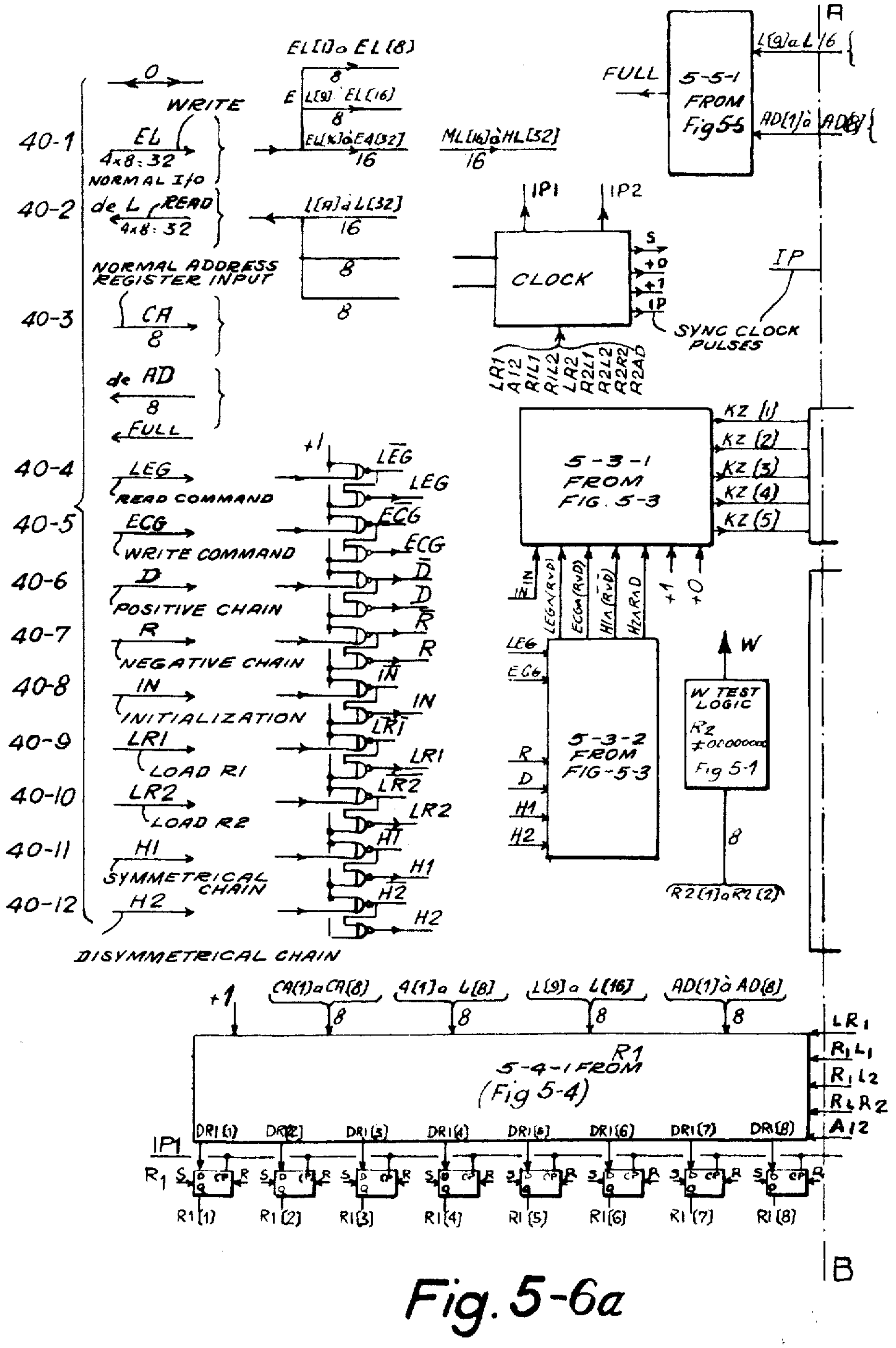
Figures 5, 6, 6B:
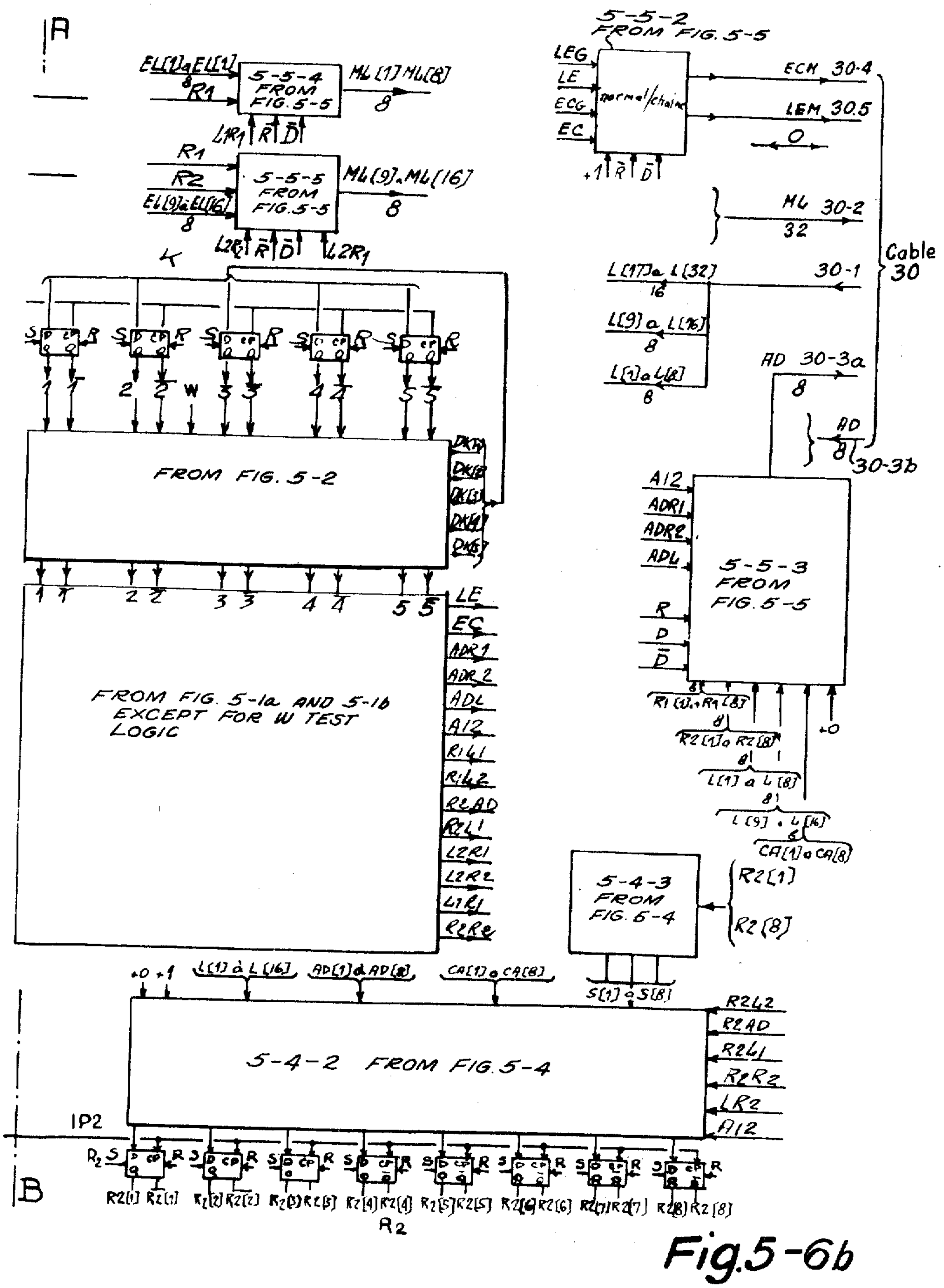

On the left FIG. 5–6*a* can be seen the ensemble of wires called the command and use cable (cable 40 of FIG. 1), on the right in FIG. 5–6*b* the connecting cable 30 of FIG. 1.

Considering the numerous loads of signal sources supplying command currents, a group of amplifier circuits is inserted between the command wires and the user circuits. Thus signal LEG (reading command signal at the input of the control device) is amplified in current a first time to give a signal $\overline{\text{LEG}}$ (the bar signifying the logic complement in the coding selected) and then signal $\overline{\text{LEG}}$, amplified in turn gives LEG. "Expander" circuits are generally used for this purpose and they are identical from the logical viewpoint with the complemented "and" circuits. However, the unused inputs of the complemented and circuits would be connected to the power source supplying logical signal 1, indicated by +1 (or again the logical signal "true").

The same holds with signal ECG (writing command), D and R (positive or negative direction of reading/writing in a chain), IN (initialization command), LR1 and LR2 (commands for loading of registers R1 and R2), H1 (symmetrical chaining command) and H2 (disymmetrical chaining command). The expander circuits used should be able to supply at least ten loads, i.e., it is possible to connect there at least ten inputs of other logical circuits.

The sub-ensemble of switching microcommands, represented in detail and for one of the possible embodiments by FIGS. 5–1*a* and 5–1*b,* generates transfer command signals proper to each phase.

Thus, by way of example, when register K carries information corresponding to phase 4, i.e., +0 on the output Q of trigger circuit K [1], +0 on the output Q of trigger circuit K [2], +1 on the output Q of trigger circuit K [3], +0 on the output Q of trigger circuit K [4], and +0 on the output Q of trigger circuit K [5], it being understood that +0 is the logical signal corresponding to "false" (and +1 that of "true"), the logical circuits of the switching subensemble should generate transfer command signals R1 ← AD, AD ← R2 and R2 ← R2 +1. The transfer AD ← R2 is actually commanded by a logical signal ADR2, worked out by the corresponding circuit of FIG. 5–1*a.* Since this same command should be generated when register K is in the states corresponding to phases 11, 15, 21, 25, logical signal ADR2 should be equal to +1 for the states 00100 (Phase 4), 01011 (Phase 11), 01111 (Phase 15), 10101 (Phase 21) and 11001 (Phase 25) of register K and to +0 for all other states.

If the signals coming from outputs Q of the K register trigger circuits are designated by 1, 2, 3, 4, 5, said trigger circuits should generally be arranged so as to be provided with a second output $\overline{Q}$ carrying a signal which is the logical complement or negation of that coming from Q.

The signals coming from these outputs are designated $\bar{1}$, $\bar{2}$, $\bar{3}$, $\bar{4}$, $\bar{5}$ in the same way and if, for example, 2 is equal to "true", $\bar{2}$ is equal to "false".

Under these conditions, logical signal ADR2 can be represented by:

$$ADR2 = (\bar{1}\wedge\bar{2}\wedge 3\wedge\bar{4}\wedge\bar{5}) v (1\wedge 2\wedge\bar{3}\wedge\bar{4}\wedge 5) v (1\wedge 2\wedge\bar{3}\wedge\bar{4}\wedge 5)\ v (\bar{1}\wedge 2\wedge\bar{3}\wedge 4\wedge 5) v (\bar{1}\wedge 2\wedge 3\wedge 4\wedge 5)$$

whose five terms correspond to 00100 10101 1811001 01011 01111 the signs ∧ and v being the usual symbols of intersection and union of binary Boolean algebra. The application of well known rules makes it possible to simplify slightly by condensing the last two terms into $\bar{1}\wedge 2\wedge 4\wedge 5$.

Application of other well known rules makes it possible to achieve unions of intersection by putting into cascade two complemented "And" circuits (often called NAND gates), according to the diagram ADR2 of FIG. 5-1*a,* wherein the NAND circuits are represented according to the most current norms.

Fourteen other transfer command signals are thus materialized by means of other two-layer "or" and "and" circuits complemented according to the regular rules of the art, as shown in FIGS. 5-1*a* and 5-1*b.*

FIG. 5-1*f* represents in addition the generator of test signal W or R2 = 00000000 realized by putting two complemented "and" circuits in cascade, the second having, of course, its unused inputs connected to signal +1.

FIG. 5-2 represents the ensemble of logical circuits working out the codes of the states of the K register trigger circuits of certain of the successive phases, according to the five logical equations appearing there. It will be found, for example, that the successor of phase 0 defined by 00000 has for code 00000, KZ [1] to KZ [5] being assumed equal to +0. It will also be found that 01011 "succeeds" 01010, that 01100 succeeds 01011, that 00000 succeeds 11100 and so forth.

The outputs of the two-layer logical circuits DK [1], DK [2], etc. are connected to the inputs known as "D inputs" of the trigger circuits called, precisely because of that, D type trigger circuits (other trigger circuits are, for example, JK type). These trigger circuits, as those of registers R1 and R2 are of the same type. They function in a synchronized way i.e., the signal DK [1], for example, is memorized and propagated to output Q and only if there is synchronization pulse (more exactly its leading edge) on lines IP, $IP_1$ and $IP_2$.

In contrast with JK types of trigger circuits, it is therefore not necessary to work out a logical signal of the type of DK [1] and its complement.

However, it is understood that the use of trigger circuits of a given type, also that of logical circuits of given type, the choice of Boolean formulas, the choice of the code do not in any way limit the claims belonging to the present invention and are given here by way of non-limiting example of embodiment.

The arrows in Table I indicate what are called "forcings". For example, if register K is "forced" to contain 00001, the development of the chaining of all the cells of memory M takes place.

Inputs KZ [1] to KZ [5] of the logical circuits of FIG. 5-2 are provided to permit effectively the forcing in register K of binary quantities 00001, 00101, 00111, 01001, and 10011, themselves functions of commands of reading LEG, writing ECG, initialization IN, symmetrical chaining H1 and disymmetrical chaining H2.

Another object of this type of forcing is to avoid, at the time of turning on power, the output of erroneous commands that would result from absolutely any state of register K. Moreover, the trigger circuits of the registers have two inputs known as S and R (set and reset) which make it possible to memorize there either a logical +1 by input s or a logical +0 by input R independently of the synchronization pulses IP, starting therefore consists in storing a +1 in this way in the five elements of register K.

Consequently, all the variables 1, 2, 3, 4 and 5 have a value of +1 and $\bar{1}$, $\bar{2}$, $\bar{3}$, $\bar{4}$ and $\bar{5}$ have a value of +0. Examination of the Boolean formulas of FIGS. 5-2 then show that signals DK [1] to DK [5] are equal to KZ [1]...KZ [5]. At the first of pulses IP, register K will therefore be in the latency state and will not induce any emission of switching microcommand and, further, said register will be able, at any later moment, to be "forced" to the value implied by the coders and under the command coders represented in FIG. 3.

Suitable emission and stopping of signals S, IP and also of the various feeds and logical "off" and "on" signals sometimes referred to as +0 +1 respectively and the fact of the starting cadence unit consisting principally in an arrangement of multivibrators and monostable devices and power amplifiers usually used, not being part of the invention are not represented in detail.

Referring again to FIG. 5-2, circuit DK [4] has an input known as W, connected to the output of the corresponding circuit of FIG. 5-1. Signal W is zero if all the signals $\overline{R2}$ [1] to $\overline{R2}$ [8] are "true," i.e., all signals R2 "false" or again R2 = 0. The nullity of W therefore entails a state 00000 as the successor of the state 00100.

FIG. 5-4 represents the input switchings on registers R1 and R2.

It will be noted in connection with the diagrams of this figure that it is to repeat eight times the diagrams DR1 which actually correspond to DR11 [1], DR1 [2], etc. CA [1], CA [2], etc., L [1], L [2], L [3] to L [8] for L1, L [9], L [10] to L [16] for L2.

The diagram giving DR2 should be repeated seven times the current indices from 1 to 7, diagram DR2 [8] defining the input on the eighth trigger circuit of R2.

In FIG. 5-4 will also be found the diagram of the unit incrementer used by phase 4 of the initialization process, said diagram not being at all claimed by the present invention.

FIG. 5-5 represents:

the input switch of address register AD of memory M, a register outside the control device and the input switch on connecting register L of said memory; also outside the control device and the input switch of writing/reading commands which make it possible to choose between intervention and nonintervention of the control device.

The complete memory test device which, comparing the content of AD with that of L2 (L [9] to L [16]) makes it possible in particular to signal the moment when the reserve chain, i.e., the chain resulting from multiple borrowings from the initialization chain is reduced to a single address chain 0 whose segments 1 and 2 will then also carry 0 as the addresses of positive and negative chaining.

There should be noted, in connection with FIG. 5-4, the repetitive character of the input switchings on these external registers.

It is understood that a control device is still according to the present invention regardless of the common number of elements R1, R2, AD and of the two chaining segments of the cells and of the connecting register L of a memory.

By way of example, a memory of 4,096 cells can be used according to the invention if two chaining segments of each cell and of the connecting register, registers R1, R2, AD have for a common number of elements 12 while the incrementing device of R2 and the filled memory test comprise 12 inputs.

By way of a second example, a memory of 65,536 cells could be used with a number of elements as with the registers and circuits cited above equal to 16.

Still referring to FIGS. 5-6*a* and 5-6*b*, the operation of the ensemble will now be analyzed. In particular, the pulse generator, which causes the various logical signals to go into the trigger circuits of registers R, K, is synchronized with or itself synchronizes the pulse generator proper to the memory so that the logical signals are registered correctly in the various registers, according to the rules relating to D type trigger circuits as will be appreciated.

If all the commands, R, D, IN, LR1, LR2, H1 and H2 are in zero logical state, the ensemble functions as if the control device is nonexistent and access to the memory is achieved by means of groups of wires L and EL intended for reading and writing of register L, group CA intended for writing in address register AD and reading commands without erasure LEG and writing after return of zero ECG, it being understood that the memory unit properly so-called contains all the circuits necessary for its regular operation.

Sending of a non-zero logical signal over a wire marked IN "chains" all the cells if said signal is a pulse with a time greater than a certain minimum and less than a certain maximum. In the contrary case, register K could not receive the "forcing" signal 00001 or, on the other hand, would be forced to an erroneous content.

If it is desired to escape this condition of dynamic calibration, all that is required is to replace the first complemented "and" circuits whereby are injected KZ [1], KZ [2], KZ [3], KZ [4] and KZ [5] by complemented "and" circuits excited by $\bar{1}\ \bar{2}\ \bar{3}\ \bar{4}\ \bar{5}$ KZ [1], $\bar{1}\ \bar{2}\ \bar{3}\ \bar{4}\ \bar{5}$ KZ [2], $\bar{1}\ \bar{2}\ \bar{3}\ \bar{4}\ \bar{5}$ KZ [3], $\bar{1}\ \bar{2}\ \bar{3}\ \bar{4}\ \bar{5}$ KZ [4] and $\bar{1}\ \bar{2}\ \bar{3}\ \bar{4}\ \bar{5}$ KZ [5].

Under these conditions it will easily be found that register K can be "forced" only when it is in the latency state with the exclusion of any other and there is no longer any condition of maximal time of the signal IN.

Loading of registers R1 and R2 by the signal present on the CA level is commanded by instant pulses of suitable time, LR1 and LR2 necessarily staggered at least by a cycle, otherwise the registers R1 and R2 are loaded with the same information, which is useless.

According to the respective situation of the address informations contained in R1 and R2, command H1, dynamically limited as IN and like it without limitation if the input of signals KZ is made according to the remark made above, links two chains or creates two chains from a single one.

If each phase has a time equal to that of a complete memory cycle, the total time of a chaining or unchaining is 20 cycles.

A man skilled in the art can reduce this time by providing for the logical transfers a cycle of $t_1$ nanoseconds (from 50 to 200 nanoseconds) generated by the source of pulses feeding IP at a rate of one of these cycles per memory cycle properly so-called $t_2$ and preceding the latter so that in the ensemble, the total time of a chaining operation can be reduced a little less than 50 percent in relation to the simplest arrangement, considering that according to Table I, a transfer cycle precedes a memory cycle in a regular way but, doing this, does not go outside the claims of the present invention and that $t_1 << t_2$.

Command H2 corresponds to the half-chaining, the changes act only on the contents of the first segments. In relation to the arbitrary conventions of directions adopted in the descriptions, a negative chaining will be involved. Contrary to the symmetrical chaining in which the sectioning bar (FIGS. 2 and 3) follows in the positive direction the address cells contained in R1 and R2, the sectioning bar precedes the addresses contained in R1 and R2, if the process is broken by phase 19, by forcing of register K at 10011.

The commands of reading cycle without erasure or of the writing cycle with return to previous zero LEG and ECG are defined by the two logical parameters R and D.

If these two parameters are zero, the device reads or writes in memory M according to the address contained in AD which is that transmitted normally by channel (group) CA.

If D is not zero, the reading or writing is performed in the link immediately contiguous in the positive direction to the link whose address is initially in AD.

If R is not zero together with zero D, the reading or writing is performed in the link immediately contiguous in the negative direction.

Without going into too many details relating to a use of an ensemble, a few words will be said here on the evaluation of mathematical formulas, for example 5.29 × 2 − 2.58.

To write this formula, initializing will be begun by applying IN, then by repeated application of ECG with parameter D, the above 11 symbols will be written in their normal order of presentation.

It will be noted at each writing the user can know by means of register L which is entirely accessible, what the address of the succeeding available link will be. Reading at this address of the first segment will indicate the address of the symbol just written.

All the address worthy of interest can be put in memorization in the memory itself as we shall see below.

Thus, it is possible to note the addresses of the symbol X then of the symbol −, therefore indirectly those of symbols 9 and 2 preceding X and −. An external multiplication device can then by negative reading successively analyze the various digits of the factors and set down the successive digits of the result by negative writing from the initial address 0. This partial result, 10.58 will be able to be chained on itself, the corresponding addresses being known.

The same will be true with the series -2.58 which then will be merged with 10.58 to give the chain 10.58 − 2.58, then this chain in turn will be merged with the reserve chain, the two addresses being, on the one hand, 0, and, on the other hand, that containing the terminal symbol 8, and, consideration being made of the fact that the reserve chain will contain from the address of the link contiguous with the address link 0, the expression 10.58 − 2.58.

A second identical cycle of operations, starting from this last expression will lead to 8.00.

It will be noted that if the chaining segments of the address cell 0 are often modified, the third segment is never used except externally and consequently can receive one or more characteristic addresses and those of links containing X and −, for example.

If it is desired to memorize more than two chaining parameters, the third segment can then contain an address of a link of a closed chain devoted solely to this use and by degrees an entire hierarchy of closed symmetrical chains which is known to constitute one of the best known means of access by address by the content (or address by association).

| | Phases | Transfers | Following code phase |
|---|---|---|---|
| | 0 | | K ← 00000 |
| IN → | 1 | R1 ← 255; AD ← 0; R2 ← 1 | K ← 00010 |
| | 2 | L1 ← R1; L2 ← R2 | K ← 00011 |
| | 3 | EC | K ← 00100 |
| | 4 | R1 ← AD; AD ← R2; R2 ← 27R2+1 | K ← 00010 if R2 ≠ 0 otherwise 00000 |

-Continued

| | Phases | Transfers | Fol-wing code phase |
|---|---|---|---|
| LEG → | 5 | ← AD ← $(L1 \wedge R \wedge D) \vee (L2\ D)$ | K ← 00110 |
| | 6 | LE | K ← 00000 |
| ECG → | 7 | AD ← $(L1 \wedge R \wedge \overline{D}) \vee (L2\ D)$ | K ← 01000 |
| | 8 | EC | K ← 00000 |
| H1 → | 9 | AD ← R1 | K ← 01010 |
| | 10 | LE | K ← 01011 |
| | 11 | R1 ← L2; AD ← R2; R2 ← 27AD | K ← 01100 |
| | 12 | LE | K ← 01101 |
| | 13 | R1 ← L2; L2 ← R1 | K ← 01110 |
| | 14 | EC | K ← 01111 |
| | 15 | AD ← R2; R2 ← L2 | K ← 10000 |
| | 16 | LE | K ← 10001 |
| | 17 | L2 ← R1 | K ← 10010 |
| | 18 | EC | K ← 10011 |
| H2 → | 19 | AD ← R1 | K ← 10100 |
| | 20 | LE | K ← 10101 |
| | 21 | R1 ← L1; AD ← R2; R2 ← 27AD | K ← 10110 |
| | 22 | LE | K ← 10111 |
| | 23 | R1 ← L1; L1 ← R1 | K ← 11000 |
| | 24 | EC | K ← 11001 |
| | 25 | AD ← R2; R2 ← L1 | K ← 11010 |
| | 26 | LE | K ← 11011 |
| | 27 | L1 ← R1 | K ← 11100 |
| | 28 | EC | K ← 00000 |

TABLE II 255 dec. ≡ 11111111 bin. : 256 dec. ≡ 00000000 bin. : 1 dec. ≡ 00000001 bin. : indicates the simultaneity of transfers on both sides. If R = 3 L2 = 4 the result of R1 ← L2; L2 ← R1 is R1 = 4 L2 = 3 while the result of

R1 ← L2
L2 ← R1 would be R1 = 4 L2 = 4

I claim:

1. In combination with a conventional random-access memory having a read-write data register, an address register, and command wires therefor, an electronic control device comprising:

a control register circuit means (20-1) of conventional type characterized by a specific register (*k*) having different possible states, two externally modifiable registers (R1 and R2) of conventional flip-flop type, incrementing means (5-4) connected to one of said registers (R2) for incrementing, by one, the contents of said one of said registers (R2), said control register circuit means including a plurality of gates and logical circuit means interconnected with said specific register, said address register and said externally modifiable registers for transferring and comparing binary information between said address, read-write and externally modifiable registers and for controlling accesses to the address register of the random access memory, to two defined and specialized segments of the memory, to command wires of the random access memory read-write data register, and to command wires of the random access memory, each state of the specific register (*k*) in the control register circuit means corresponding to a determined one phase of several possible phases of the gates and logical circuit means in the control device and the sequence of said phases being triggered by an external initialization command means (5-3-1, 5-3-2), said gates and logical circuit means including:

a conventional combination of logic circuit means (5-2) connected to determine the content of said specific register (*k*) therein according to said states, and further means (5-1*a*, 5-1*b*) to cause four predetermined ones of said phases (phases 1–4) to successively act in turn to form one cycle of initialization (IN) corresponding to the chaining of a word of the random access memory and which four predetermined phases are caused by said further means to act collectively by incrementing, comparing and transferring binary information between specified ones of said address, read-write and externally modifiable registers and to emit appropriate command signals along said command wires to the random access memory for each of the words being accessed in the random access memory thereby initially linking all such words together in a reserve chain, said further means for causing said cycle of initialization including:

means to produce a corresponding cycle for writing the address (from RI) of an immediate neighbor word in a negative or backward direction, in a first segment of said word corresponding to a first segment LI of the read-write data register means for writing the address (from R2) of the immediate neighbor word in a positive or forward direction in another second segment of the said word corresponding to a second segment L2 of the read-write data register by appropriate commands to the random access memory wherein this writing is made for all the words being accessed by incrementing by one unit the contents of the two segments L1 and L2 of the read-write register cited above at each cycle, and means for disrupting the cyclic initialization in response to an eventual response of a test of comparison made at each cycle with the address of the word at the beginning of the command, (000 . . . for example), so that all words of the random access memory being accessed are caused to be elements of an initial closed symmetrical reserve chain, the two segments of all of the words of the random access memory corresponding to L1 and L2 being backward and forward pointers respectively where other segments or parts of these words are utilized for the storage and processing of external information.

2. A control device as defined in claim 1 wherein said gates and logical circuit means further includes:

a plurality of additional logic circuit and gate means for producing signals corresponding to a sequence of eighteen succeeding phases acting successively in turn when triggered by an external command, including:

means for executing a merge-split cycle (H1) during the first nine of these succeeding phases, comprising:

means for exchanging the contents of one of the two externally modifiable registers (R1 and R2) and the address register of the random access memory, means for performing another exchange between the other of the externally modifiable registers and the second segment (L2) of the read-write data register, and means for transferring other ordinances between the address register, the read-write register and said externally modifiable register (R1 and R2) to exchange contents between second chain word segments corresponding to second segment (L2) of the read-write data register, said second chain word segments corresponding to forward pointers, means for executing a further merge-split cycle (H2) during the last nine of these succeeding phases comprising:

means for exchanging the contents of one of the two externally modifiable registers (R1 and R2) and the address register, means for performing another exchange between the other of the externally modifiable registers and the first segment (L1) of the read-write data register, means for transferring other ordinances between the address register, the read-write register and said externally modifiable registers (R1 and R2) to exchange contents between first chain word segments corresponding to the first segment (L1) of the read-write data register, said first segment corresponding to a backward pointer, thereby exchanging the forward pointers of the two words whose addresses are specified by the two externally modifiable registers (R1 and R2) and exchanging the backward pointers of the forward neighbor of these two words, the contents of the externally modifiable registers remaining unchanged after the completion of the entire cycle regardless of whether these words are members or not of the same closed symmetrical chain; in the first case, the chain is split in two and in the latter case two separate chains are merged into one.

3. A control device as defined in claim 2 wherein the gates and logical circuit means includes:

still further additional logic circuit and gate means for producing signals corresponding to two different and independent sequences (LEG and ECG) of two phases each, the first (LEG) being produced by an external specialized command of reading, the second (ECG) being produced by an external specialized command of writing and further including, means for producing two other electrical signals, forward and backward, one or the other through a series of bi-directional conditionable gates, means for directing the transfer of contents of one of the two segments (L1 and L2) of said data memory register corresponding to backward and forward pointers to the address register in such a manner as to simplify the reading and the writing of the other segments or parts of the successive elements of a closed symmetrical chain, comprising, means for permanently applying said forward signal in a forward or positive direction, means for permanently applying said backward signal in a backward direction, and, means for reiterating each command of reading and writing, with no respecification of the contents of the address register.

4. A control device as defined in claim 3 comprising further:

a combination of additional logic circuit means whose inputs are connected to outputs of said address register and to outputs of one of the two segments (L1 and L2) of the read-write data register, said outputs occurring if and only if the contents of the two connected registers thereto are identical, said combination of ciruit means comprising a plurality of complemented half adder-circuits, one for each corresponding bit in the two registers to compare, whose outputs are coupled together as inputs to a multiple input AND logic circuit, the contents of the two registers being identical if and only if the word whose address is stored in the address register of the random access memory upon a read or write command is a unique member of a closed symmetrical chain, whereby a signalling device points out a "void chain" when said address is stored in the address register.

* * * * *